United States Patent [19]
Jones et al.

[11] 3,993,342
[45] Nov. 23, 1976

[54] CONVERTIBLE VEHICLE CARRIER

[76] Inventors: Paul Jones, 4347 Moon Light Drive;
Ferris Jones, 4307 Moon Light
Drive, both of Holly, Mich. 48442

[22] Filed: Nov. 4, 1974

[21] Appl. No.: 520,564

[52] U.S. Cl. .............................. 296/1 A; 280/106 T
[51] Int. Cl.² ............................................ B60P 3/06
[58] Field of Search ................. 296/1 A; 105/368 R, 105/368 B; 214/85; 280/106 T

[56] References Cited
UNITED STATES PATENTS

| | | | |
|---|---|---|---|
| 2,750,225 | 6/1956 | Mettetal, Jr. | 296/1 A |
| 2,834,631 | 5/1958 | Taraldsen | 296/1 A |
| 3,084,970 | 4/1963 | Day | 296/1 A |
| 3,343,865 | 9/1967 | Stuart | 296/1 A |
| 3,580,627 | 5/1971 | Underwood et al. | 296/1 A |
| 3,720,437 | 3/1973 | Lambert | 296/1 A |

Primary Examiner—Robert J. Spar
Assistant Examiner—Donald W. Underwood
Attorney, Agent, or Firm—Basile, Weintraub and Vanophem

[57] ABSTRACT

A semi-trailer having an elongated frame constructed to support mobile machinery such as a bulldozer, a small crane, a backhoe and the like, and having a pair of ramps for supporting three automotive passenger vehicles such as pick-up trucks when not employed for transporting machinery.

3 Claims, 5 Drawing Figures

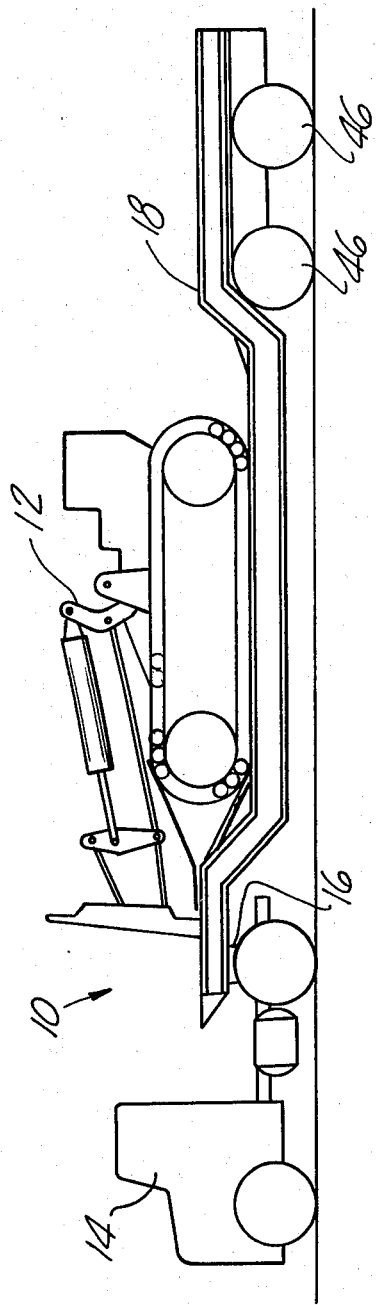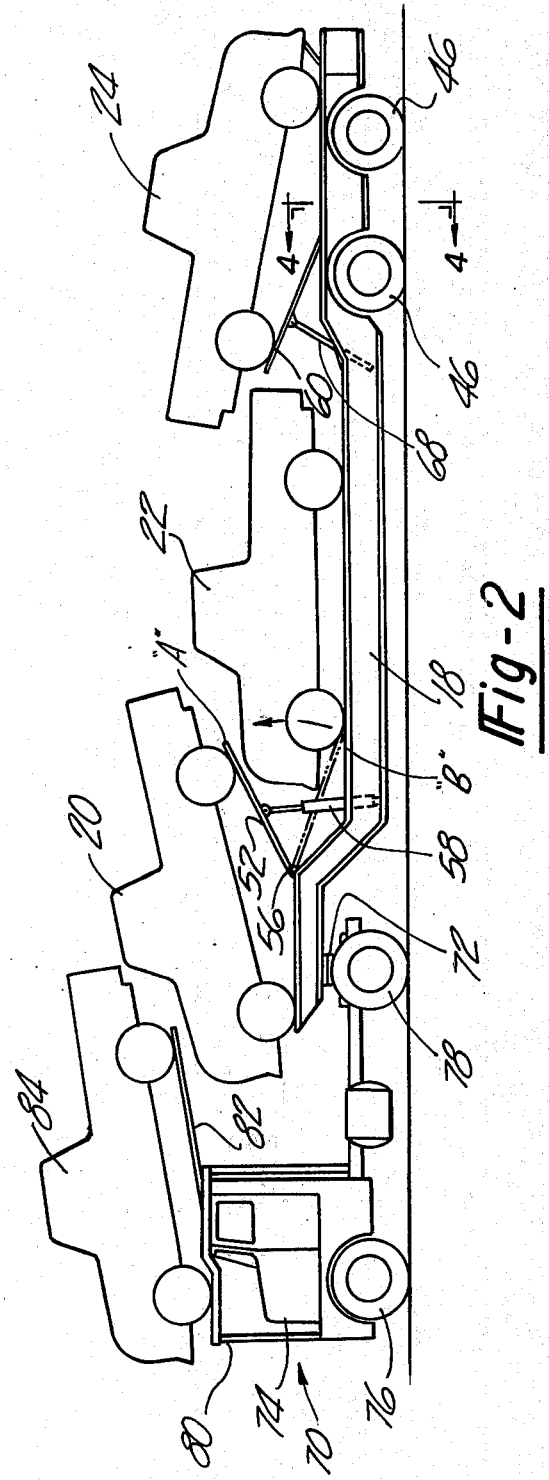

CONVERTIBLE VEHICLE CARRIER

BACKGROUND OF THE INVENTION

This invention relates to vehicle carriers and more specifically to a flat bed semi-trailer for transporting either heavy mobile machinery, or three automotive passenger vehicles.

Mobile machinery such as earth moving equipment is usually transported on a trailer having a bed fabricated of several parallel, longitudinal I beams or ship channels in order to provide the longitudinal strength necessary for supporting such machinery. Such trailers have sides that do not extend above the flat bed in order to accommodate the width and the clearance necessary for moving the machinery on the trailer's bed.

The prior art shows that U.S. Pat. No. 2,684,264 issued Jul. 20, 1954 to N. Demos, disclosed a trailer having a plank deck for supporting ordinary freight or vehicles in end-to-end relationship. To increase the utility of such a trailer, portions of the plank deck were removable to load three pick-up trucks in overlying positions. A problem with such an arrangement is that the boxes of some of the pick-up trucks had to be removed in order to load them on the trailer.

SUMMARY OF THE INVENTION

The broad purpose of the present invention is to increase the utility of flat bed trailers by providing a pair of ramps for supporting three pick-up trucks on the trailer bed without either removing a portion of the trailer bed, or disassembling the trucks.

In the preferred embodiment of the invention, the trailer is formed with an elongated frame of I beams and ship channels. The mid-section of the trailer is below the top of th trailer's rear wheels. The beam construction of the frame is adapted to support either heavy mobile machinery to be carried on the trailer's mid-section, or a pair of automotive passenger vehicles such as pick-up trucks, in end to end relationship.

The combined lengths of three pick-up trucks is greater than a standard length semi-trailer. To carry such a load, a pair of ramps are mounted on the trailer at opposite ends of the midsection. The forward ramp is mounted such that a first vehicle can be driven to a position in which its forward wheels are adjacent the forward end of the trailer, and its rear wheels are on the ramp. A hydraulic power unit then raises the ramp with the rear end of the first vehicle above the trailer bed to a height such that the forward end of a second vehicle can be driven to a position in the trailer's midsection beneath the rear end of the first vehicle.

The second ramp is raised to an inclined position behind the second vehicle to receive the forward wheels of a third vehicle to support its forward end above the rear of the second vehicle. The rearward wheels of the third vehicle are disposed on the trailer bed adjacent the trailer's rear wheels.

The position of the first vehicle on the trailer is such that a conventional vehicle-carrying tractor having a fourth vehicle mounted above the tractor's cab can be connected to the trailer thereby providing a multi-vehicle carrier combination.

Still further advantages of the present invention will become apparent to those skilled in the art of the invention upon reference to the following description of the preferred embodiment.

DESCRIPTION OF THE DRAWINGS

The description refers to the accompanying drawings in which like reference characters refer to like parts throughout the several views, and in which:

FIG. 1 is a view of a bulldozer mounted on a semi-trailer embodying my invention, FIG. 2 is a view of the semi-trailer of FIG. 1 supporting three pick-up trucks in accordance with the teachings of my invention;

DESCRIPTION OF THE PREFERRED EMBODIMENT

Figure 3:
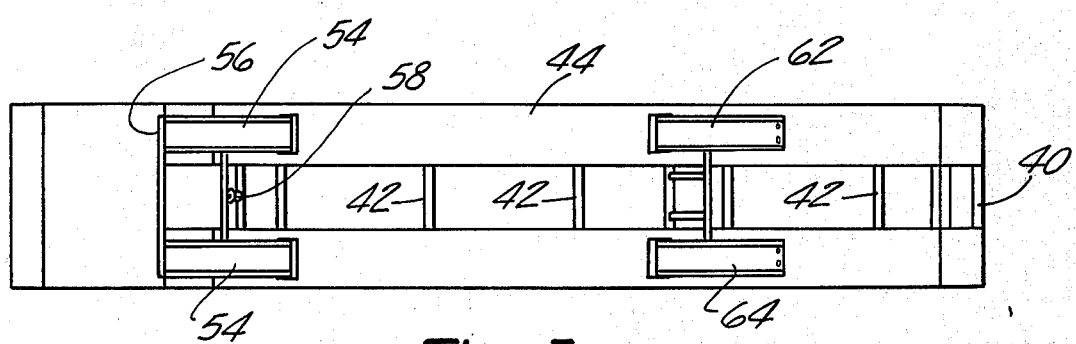
FIG. 3 is a plan view of the preferred semi-trailer.

Referring to the drawings, a vehicle carrier 10 is shown in FIG. 1 for moving heavy mobile or earthmoving machinery such as bulldozer 12. Carrier 10 includes a conventional tractor 14 connected by fifth wheel means 16 to the forward end of trailer 18. Trailer 18 has an elongated body suited for supporting a relatively heavy item of equipment in its mid-section, or several lighter weight automotive passenger vehicles such as pick-up trucks 20, 22 and 24 which are shown in FIG. 2.

Figure 4:
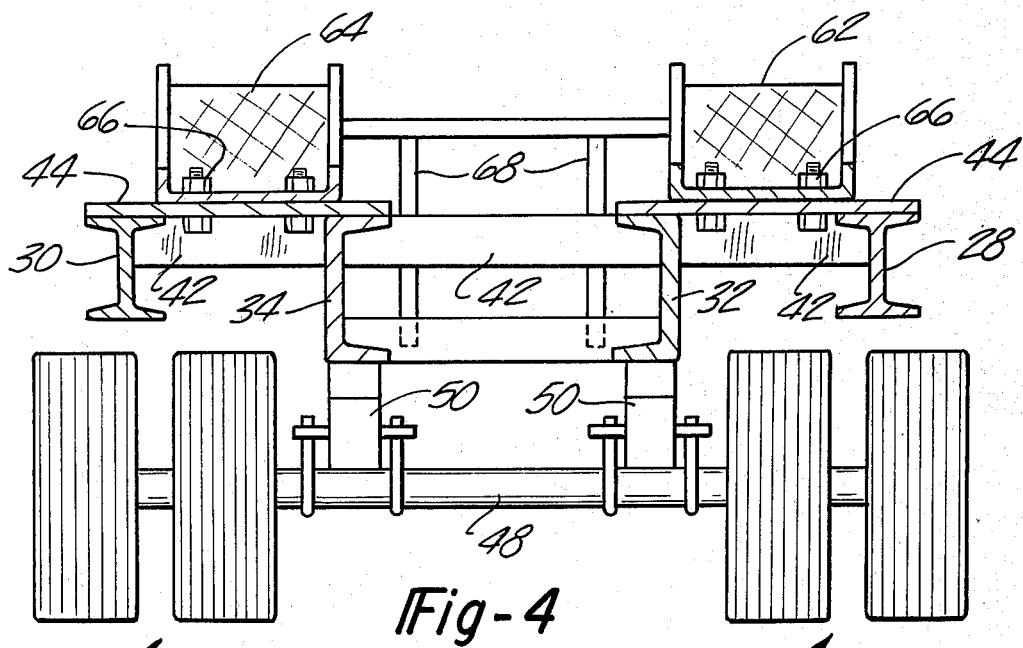
FIG. 4 is an enlarged sectional view taken along lines 4—4 of FIG. 2.
Figure 5:
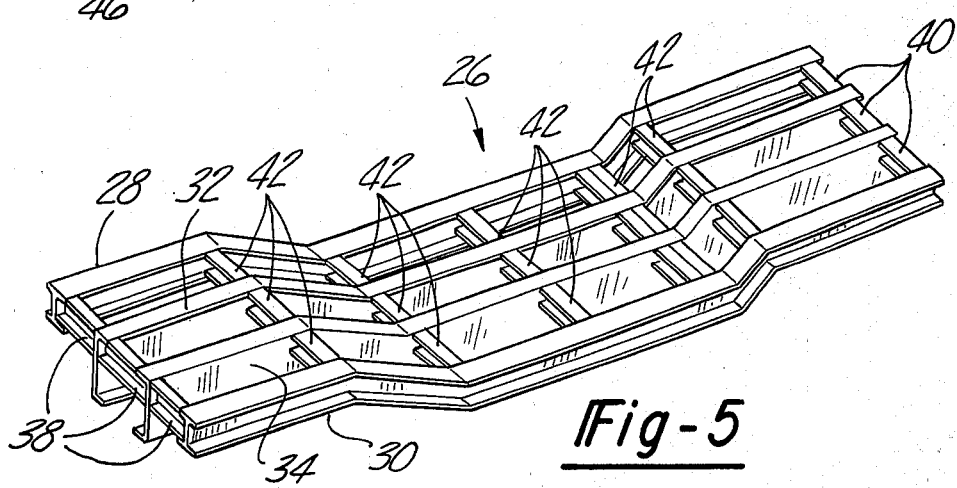
FIG. 5 is a perspective view of the trailer framework.

Referring to FIGS. 4 and 5, trailer 18 has an elongated framework 26, which unlike trailers conventionally employed for transporting automotive vehicles from an assembly plant to a sales outlet, has a bed fabricated of I beams and ship channels. Framework 26 has two parallel longitudinal beams 28 and 30 forming the sides of the bed along the full length of the trailer. Beams 28 and 30 are preferably formed of steel I beams. The distance between beams 28 and 30 accommodates the tracks of bulldozer 12.

A second pair of longitudinal beams 32 and 34 are disposed between and parallel to beams 28 and 30. Beams 32 and 34 are oppposedly mounted ship channels having their upper flanges parallel to the upper flanges of beams 28 and 30. Cross beams 38 join together the forward ends of longitudinal beams 28, 32, 34 and 30 while cross beams 40 join together the rear ends of the longitudinal beams to form a sturdy, rigid framework. Intermediate cross beams 42 are connected to the four longitudinal beams at appropriate positions along the framework 26. Cross beams 38, 40 and 42 are short sections of I beams having their ends welded to the longitudinal beams 28, 32, 34 and 30.

Metal plate 44 is mounted on the longitudinal beams to form the bed of trailer 18 and a conventional king pin (not shown) is carried at the forward end of framework 26 fo engaging the fifth wheel means 16 of tractor 14. Rear wheels 46 are connected by axle 48 and spring means 50 to the rear end of framework 26 as shown in FIG. 4. As best shown in FIG. 1 the mid-section of framework 26 between rear wheels 46 and fifth wheel means 16 is below the top of the rear wheels. The absence of any side structure on the trailer 18 above plate 44 allows a large piece of equipment such as bulldozer 12 to be maneuvered on and off the trailer without interference with the trailer structure.

A forward ramp 52 is mounted on framework 26 at the forward end of the lowered mid-section. Ramp 52 has a pair of elongated channel-shaped tracks 54. Pivot means 56 connect the forward end of ramp 52 to the framework 26 such that the rearward end of the ramp can be lowered to engage the mid-section of framework 26 as illustrated at B in FIG. 2. In such a position, tracks 54 are disposed to receive the wheels of truck 20 being driven from the mid-section to the forward end of the trailer. Hydraulic power means 58 is connected between framework 26 and ramp 52 to raise it with the rear end of truck 20 to a transport position as shown at A. In its raised position, ramp 52 supports pick-up truck 20 a sufficient distance above the trailer mid-section that the forward end of the second pick-up truck 22 can be disposed beneath the rearward end of truck 20.

A second ramp 60 is mounted on framework 26 at the rear of the lowered mid-section of framework 26. Ramp 60 also has a pair of channel-shaped tracks 62 and 64 spaced from one another a distance to accommodate the wheels of pick-up truck 24. The rearward end of ramp 60 is removably connected by fastener 66 to plate 44 as best shown in FIG. 4. A pair of legs 68 support ramp 60 in an inclined position for receiving the forward end of truck 24 in a position above the rearward end of truck 22.

In use, trailer 18, is loaded with mobile equipment by lowering ramp 52 to position B, removing ramp 60 and driving the bulldozer 12 up skids (not shown) placed against the rear end of the trailer. The bulldozer 12 is driven into its transport position in the mid-section of the trailer.

To load pick-up trucks 20, 22 and 24, ramp 52 is disposed in its lower position, and temporary skids (not shown) are mounted in the conventional manner at the rear end of trailer 18. Pick-up truck 20 is then driven up the temporary skids and onto the trailer 8 to its position above the fifth wheel means 16. With the front wheels of pick-up truck 20 disposed adjacent the forward end of framework 26, and its rear wheels mounted on ramp 52, hydraulic power means 58 is actuated to raise the rear end of pick-up truck 20 to its transport position illustrated in FIG. 2. Appropriate tie-down means are employed on pick-up truck 20 as well as the other trucks to connect them to the trailer for transport.

Pick-up truck 22 is then driven over the rear end of trailer 18 to a transport position in the trailer's mid-section in which the forward end of truck 22 is disposed beneath the rearward end of truck 20. Ramp 60 is then mounted on the trailer behind truck 22. Pick-up truck 24 is then driven to a position on trailer 18 above rear wheel means 46 in which the rear wheels of truck 24 are mounted on ramp 60 and its rear wheels are disposed on plate 44. In this transport position, the forward end of truck 24 is disposed above the rearward end of truck 22.

Ramps 52 and 60 are so disposed in their raised positions that there is sufficient clearance between trucks 20, 22 and 24 that each can be transported completely assembled i.e. with its box. In addition, ramps 52 can be lowered and ramp 60 can be removed to allow the bed of trailer 18 to carry heavy mobile machinery.

Referring back to FIG. 2, a tractor 70 is illustrated as being connected to trailer 18 by conventional fifth wheel means 72. Tractor 70 has a cab 74 mounted on an elongated chassis adjacent forward wheels 76, and rear wheels 78 adjacent fifth wheel means 72. A frame 80 is mounted on tractor 70 to support a ramp 82 above cab 74. Ramp 82 is extendable toward its position shown in FIG. 2 in which it is adapted to support a fourth pick-up truck 84. Pick-up 84 is mounted such tht its rearward end is disposed rearwadly of cab 74. When ramp 82 is not supporting truck 84, it is retracted forwardly to a position above cab 74.

It is to be noted that tractor 74 with ramp 82 is a conventional means for transporting new vehicles mounted on a conventional vehicle-carrying trailer. When connected to trailer 18, the position of truck 20 is such that its forward end is disposed beneath the rearward end of truck 84 so as to avoid contact with truck 84 when tractor 70 is being steered in a turning motion. This arrangement allows trailer 18 to be connected to a conventional vehicle-carrying tractor for transporting a total of four standard size pick-up trucks.

Having described my invention, I claim:

1. a flat bed semi-trailer adapted to be towed by a tractor for hauling either mobile machinery such as a bulldozer and the like, or for hauling automotive passenger vehicles such as pick-up trucks and the like, comprising:
   a framework having a plurality of substantially parallel, elongated longitudinal beams disposed such that a portion of each beam is disposed in a horizontal plane with similar portions of the other beams, and the distance between certain of the longitudinal beams is less than the width of the vehicles to be supported thereon, the framework being configured to define a forward end platform, a mid-section and a rearward end platform;
   ground-engaging wheel means connected below said framework adjacent to the rearward end platform thereof, the mid-section being below the top of the ground-engaging wheel means and means for connecting the forward end platform of the framework to a conventional tractor for supporting mobile machinery mounted on the longituinal beams;
   metal plates mounted on the longitudinal beams to form the bed of the trailer;
   a first ramp pivotally mounted on said forward end platform for receiving the rearward end of a first vehicle mounted on the forward end platform, the ramp having a pair of spaced apart elongated channel-shaped tracks, and power means connected to the first ramp for raising it with the first vehicle between a first mid-section engaging position and a second position in which the rearward end of the first vehicle is disposed above the mid-section to allow the forward end of a second vehicle to be supported on the mid-section below the rearward end of the first vehicle;
   a second ramp detachably mounted to the metal plate on said rearward end platform, the ramp including a pair of spaced apart channel-shaped tracks adapted to receive the tires of a motor vehicle therewithin, for supporting one end of a third vehicle above the rearward end of the second vehicle such that the rearward end of the third vehicle is mounted on said rearward end platform;
   means for readily detachably mounting the second ramp to the rearward end platform whereby the ramp can be readily removed to permit the loading of heavy machinery having a track width greater than that of the tracks of the second ramp onto the mid-section of the trailer, and
   a pair of legs extending between the second ramp and the mid-section for supporting the second ramp in an inclined position when receiving one end of the third vehicle.

2. A semi-trailer as defined in claim 1, in which the forward end of the second ramp is disposed above its rearward end when the third vehicle is mounted thereon.

3. A semi-trailer as defined in claim 1, including a tractor having a chassis with forward wheels and rearward wheels, a cab at the forward end of the chassis and a frame mounted on the chassis for supporting a fourth vehicle above the cab such that the rearward end of the fourth vehicle is disposed rearwardly of the cab above the forward end of said first vehicle.

* * * * *